(12) United States Patent
Xia et al.

(10) Patent No.: US 12,114,306 B2
(45) Date of Patent: Oct. 8, 2024

(54) METHODS, APPARATUS AND SYSTEMS FOR TRANSMITTING DATA BASED ON ASYMMETRIC BANDWIDTH PARTS

(71) Applicant: ZTE CORPORATION, Guangdong (CN)

(72) Inventors: Shuqiang Xia, Shenzhen (CN); Feng Xie, Shenzhen (CN); Ying Liu, Shenzhen (CN); Tao Qi, Shenzhen (CN); Kun Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 348 days.

(21) Appl. No.: 17/578,167

(22) Filed: Jan. 18, 2022

(65) Prior Publication Data

US 2022/0141856 A1 May 5, 2022

Related U.S. Application Data

(63) Continuation of application No. PCT/CN2019/096770, filed on Jul. 19, 2019.

(51) Int. Cl.
*H04W 72/04* (2023.01)
*H04W 72/044* (2023.01)
(Continued)

(52) U.S. Cl.
CPC ..... *H04W 72/1268* (2013.01); *H04W 72/044* (2013.01); *H04W 72/23* (2023.01)

(58) Field of Classification Search
CPC ... H04L 5/0044; H04L 5/0091; H04L 5/1423; H04W 72/044; H04W 72/0453; H04W 72/1268; H04W 72/23
See application file for complete search history.

(56) References Cited

U.S. PATENT DOCUMENTS

2019/0098655 A1 3/2019 Shih
2019/0132092 A1 5/2019 Chen et al.
(Continued)

FOREIGN PATENT DOCUMENTS

CN 108370577 A 8/2018
CN 109560905 A 4/2019
(Continued)

OTHER PUBLICATIONS

Second Office Action for CN Appl. No. 201980098567.8, dated Apr. 27, 2023 (with English translation, 16 pages).
(Continued)

*Primary Examiner* — Phuc H Tran
(74) *Attorney, Agent, or Firm* — Foley & Lardner LLP

(57) ABSTRACT

Methods, apparatus and systems for transmitting data based on asymmetric bandwidth parts in a wireless communication are disclosed. In one embodiment, a method performed by a wireless communication node is disclosed. The method comprises: configuring at least one downlink bandwidth part (BWP) for a wireless communication device, wherein each of the at least one downlink BWP is configured for a downlink transmission to the wireless communication device; configuring at least one uplink BWP for the wireless communication device, wherein each of the at least one uplink BWP is configured for an uplink transmission from the wireless communication device; and configuring a transmission resource on one uplink BWP of the at least one uplink BWP for the wireless communication device to transmit an uplink signal on the transmission resource. The uplink signal indicates a request for activating an associated downlink BWP.

20 Claims, 5 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 2019/0132862 A1 | 5/2019 | Jeon et al. | |
| 2019/0149213 A1 | 5/2019 | Zhou et al. | |
| 2020/0245295 A1* | 7/2020 | Kimba Dit Adamou | ................... H04L 5/0035 |
| 2021/0028914 A1* | 1/2021 | Jin | ........................ H04W 8/22 |
| 2021/0091914 A1* | 3/2021 | Xue | ..................... H04L 5/0098 |
| 2021/0352621 A1* | 11/2021 | Hayashi | ............ H04W 72/0453 |
| 2021/0409094 A1* | 12/2021 | Yuan | ..................... H04W 72/23 |

FOREIGN PATENT DOCUMENTS

| | | |
|---|---|---|
| CN | 109586866 A | 4/2019 |
| CN | 109588058 A | 4/2019 |
| CN | 109699084 A | 4/2019 |
| CN | 109803415 A | 5/2019 |
| CN | 109964434 A | 7/2019 |
| CN | 109997396 A | 7/2019 |
| EP | 3 442 304 A1 | 2/2019 |
| EP | 3 668 221 A1 | 6/2020 |
| EP | 3 681 239 A1 | 7/2020 |
| WO | WO-2019/029519 A1 | 2/2019 |
| WO | WO-2019/098906 A1 | 5/2019 |
| WO | WO-2019080939 A1 * | 5/2019 .......... H04W 72/042 |
| WO | WO-2019/126067 A1 | 6/2019 |

OTHER PUBLICATIONS

CATT, "Further consideration on BWP inactivity timer" 3GPP TSG-RAN WG2#101, R2-1802141, Mar. 2, 2018, Athens, Greece (6 pages).
Ericsson, "On bandwidth parties" 3GPP TSG-RAN WG1 90bis, R1-1718523, Oct. 13, 2017, Prague, Czech Republic (2 pages).
First Office Action for CN Appl. No. 201980098567.8, dated Nov. 11, 2022 (with English translation, 14 pages).
Mediatek, Inc., "Correction on handling of BWP inactivity timer" 3GPP TSG-RAN WG2 Meeting #101, R2-1803062, Mar. 2, 2018, Athens, Greece (4 pages).
Extended European Search Report for EP Appl. No. 19938144.3 dated Sep. 13, 2022 (14 pages).
Supplementary European Search Report for EP Appl. No. 19938144.3, dated Jun. 8, 2022 (15 pages).
International Search Report and Written Opinion for PCT Appl. No. PCT/CN2019/096770, mailed Apr. 23, 2020 (7 pages).
First Examination Report for IN App. No. 202227008440 dated Oct. 30, 2023 (with English translation, 6 pages).

* cited by examiner

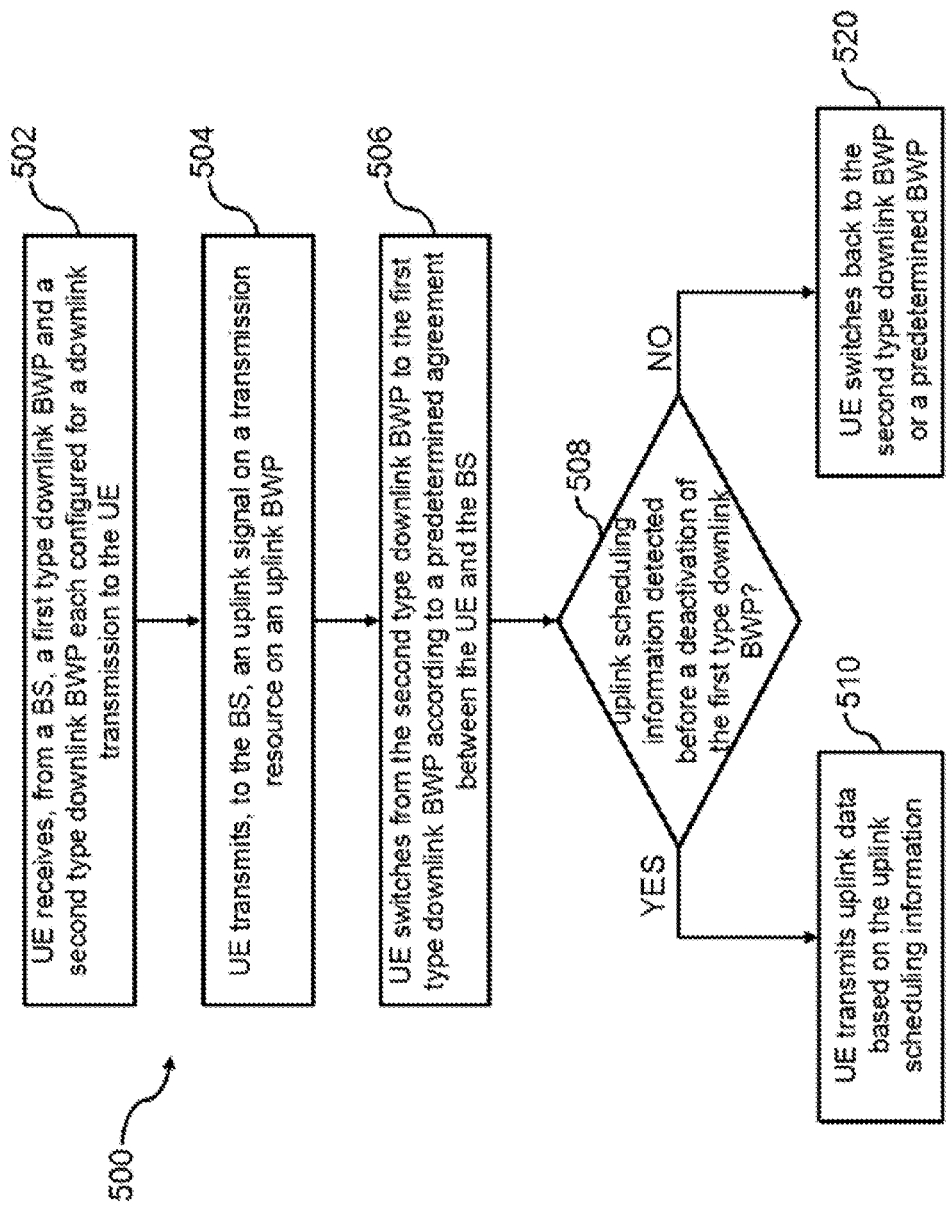

METHODS, APPARATUS AND SYSTEMS FOR TRANSMITTING DATA BASED ON ASYMMETRIC BANDWIDTH PARTS

CROSS-REFERENCE TO RELATED APPLICATION

This application claims the benefit of priority under 35 U.S.C. § 120 as a continuation of PCT Patent Application No. PCT/CN2019/096770, filed on Jul. 19, 2019, the disclosure of which is incorporated herein by reference in its entirety.

TECHNICAL FIELD

The disclosure relates generally to wireless communications and, more particularly, to methods, apparatus and systems for transmitting data based on asymmetric bandwidth parts in a wireless communication.

BACKGROUND

In order to provide a larger system and a better user experience in a fifth-generation (5G) new radio (NR) network, NR base stations can often support a large bandwidth. For example, below 6 GHz, a NR base station may support a maximum bandwidth of 400 MHz by a single carrier. To let a user equipment (UE) to support such a large system bandwidth will increase the cost and power consumption of the UE. As such, the concept of bandwidth part (BWP) has been introduced in 5G systems. A BWP refers to a continuous bandwidth. The UE does not need to support data transmission and reception in the entire system bandwidth, but only needs to support data transmission and reception within the bandwidth of the BWP.

In an existing 5G system, each UE is equipped with up to four pairs of BWPs on each carrier. Each pair of BWPs includes an uplink BWP and a downlink BWP. A UE may have only one pair of active BWPs at a time. The base station can choose to activate different BWPs according to service changes of different UEs.

An existing 5G system does not support multicast services. The above mentioned BWP design is mainly designed for unicast services. With the wide application of multicast services in the fields of Internet of Things, public safety, autonomous driving, entertainment multimedia, etc., a 5G system may be designed with a special BWP (referred to as a multicast BWP) to support multicast services. Unlike an existing BWP, the multicast BWP is usually a downlink BW. There is no uplink BWP paired with the multicast BWP. When a UE switches from a unicast BWP to the multicast BWP to receive the multicast services, the multicast BWP is in an active state, and the unicast BWP is deactivated. That is, the UE that switches to the multicast BWP lacks a resource for transmitting the uplink data. This will be a problem if the UE needs to send some uplink data at this point. This problem is particularly critical if the uplink data have a strict latency requirement and cannot wait to be transmitted after the end of the multicast BWP services.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: configuring at least one downlink bandwidth part (BWP) for a wireless communication device, wherein each of the at least one downlink BWP is configured for a downlink transmission to the wireless communication device; configuring at least one uplink BWP for the wireless communication device, wherein each of the at least one uplink BWP is configured for an uplink transmission from the wireless communication device; and configuring a transmission resource on one uplink BWP of the at least one uplink BWP for the wireless communication device to transmit an uplink signal on the transmission resource. The uplink signal indicates a request for activating an associated downlink BWP.

In another embodiment, a method performed by a wireless communication node is disclosed. The method comprises: configuring at least one downlink bandwidth part (BWP) for a wireless communication device, wherein each of the at least one downlink BWP is configured for a downlink transmission to the wireless communication device; configuring at least one uplink BWP for the wireless communication device, wherein each of the at least one uplink BWP is configured for an uplink transmission from the wireless communication device; and configuring a transmission resource on one uplink BWP of the at least one uplink BWP for the wireless communication device to transmit an uplink signal on the transmission resource. The uplink signal indicates a request for activating an associated control resource set (CORESET) or an associated search space on an active downlink BWP.

In yet another embodiment, a method performed by a wireless communication device is disclosed. The method comprises: receiving a configuration of at least one downlink bandwidth part (BWP) from a wireless communication node, wherein each of the at least one downlink BWP is configured for a downlink transmission to the wireless communication device; receiving a configuration of at least one uplink BWP from the wireless communication node, wherein each of the at least one uplink BWP is configured for an uplink transmission from the wireless communication device; receiving a configuration of a transmission resource on one uplink BWP of the at least one uplink BWP; and transmitting an uplink signal on the transmission resource to the wireless communication node. The uplink signal indicates a request for activating an associated downlink BWP.

In still another embodiment, a method performed by a wireless communication device is disclosed. The method comprises: receiving a configuration of at least one downlink bandwidth part (BWP) from a wireless communication node, wherein each of the at least one downlink BWP is configured for a downlink transmission to the wireless communication device; receiving a configuration of at least one uplink BWP from the wireless communication node, wherein each of the at least one uplink BWP is configured for an uplink transmission from the wireless communication device; receiving a configuration of a transmission resource on one uplink BWP of the at least one uplink BWP; and transmitting an uplink signal on the transmission resource to the wireless communication node. The uplink signal indicates a request for activating an associated control resource set (CORESET) or an associated search space on an active downlink BWP.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 5 illustrates a flow chart for a method performed by a UE for data transmission based on asymmetric bandwidth parts, in accordance with some embodiments of the present disclosure.

DETAILED DESCRIPTION OF EXEMPLARY EMBODIMENTS

Figure 1:
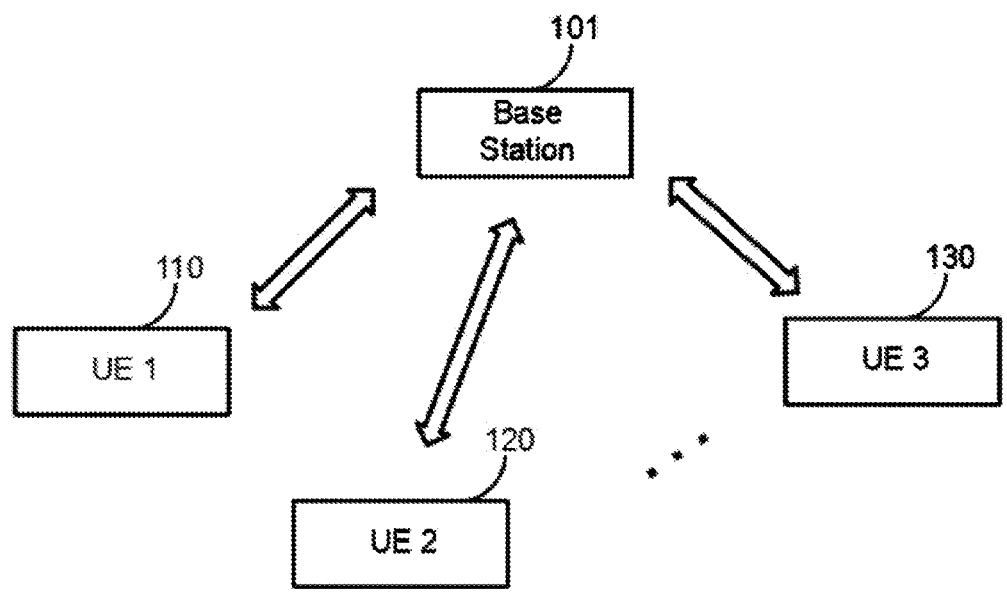
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. In a 5G NR system, the bandwidth parts (BWPs) are usually allocated in pairs. That is, transmitting data on an uplink BWP needs a cooperation and support from a corresponding downlink BWP, and vice versa. A multicast BWP is a downlink BWP with no corresponding uplink BWP. After a UE switches to the multicast BWP, the UE may still need to send data on the uplink unicast BWP. The present teaching discloses systems and methods for a UE to efficiently transmit uplink data based on asymmetric BWP allocations, i.e. when the BWP are not allocated in pairs.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. Each UE may be configured with at least one downlink BWP and at least one uplink BWP. In one embodiment, a transmission resource is configured on one uplink BWP of the at least one uplink BWP for the UE to transmit an uplink signal on the transmission resource. The uplink signal indicates a request from the UE for activating: a downlink BWP associated with the uplink signal, a control resource set (CORESET) associated with the uplink signal on an active downlink BWP, or a search space associated with the uplink signal on an active downlink BWP.

Figure 2:
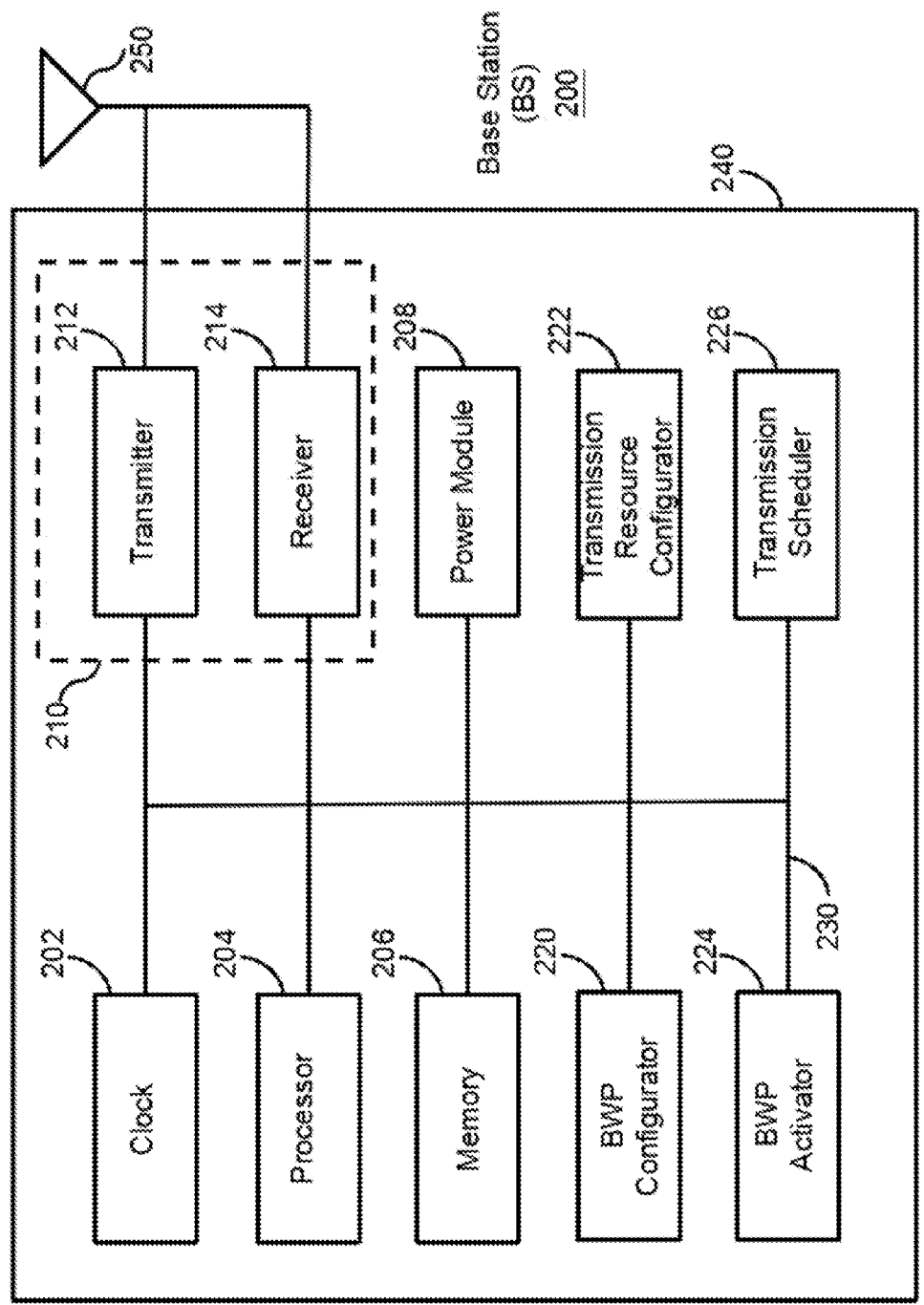
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a node or device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a BWP configurator 220, a transmission resource configurator 222, a BWP activator 224, and a transmission scheduler 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may transmit data to and receive data from a UE using BWPs. The BWP configurator 220 in this example can configure at least one downlink BWP and at least one uplink BWP for the UE. Each of the at least one downlink BWP is configured for a downlink transmission to the UE. Each of the at least one uplink BWP is configured for an uplink transmission from the UE. In one embodiment, the BWP configurator 220 configures a first type downlink BWP and a second type downlink BWP for the UE. The first type downlink BWP is configured with a control resource set (CORESET) and a search space for scheduling a physical uplink shared channel on the at least one uplink BWP. The second type downlink BWP is not configured with a CORESET or a search space for scheduling a physical uplink shared channel on the at least one uplink BWP. Among the at least one downlink BWP and at least one uplink BWP, at most one BWP is active for one link direction at one time.

In one embodiment, the transmission resource configurator 222 can configure a transmission resource on one uplink BWP of the at least one uplink BWP. The transmission resource is configured for the UE to transmit an uplink signal on the transmission resource when the uplink BWP is inactive or active. The uplink signal indicates a request for activating: an associated downlink BWP, an associated control resource set (CORESET) on an active downlink BWP, or an associated search space on an active downlink BWP. The uplink signal may be transmitted based on one of: a scheduling request; a sounding reference signal; and a physical uplink shared channel.

In one embodiment, the transmission resource may be a first type resource or a second type resource. When the uplink signal is transmitted on the first type resource, the UE switches from the second type downlink BWP to the first type downlink BWP upon transmitting the uplink signal. When the uplink signal is transmitted on the second type resource, the UE switches from the second type downlink BWP to the first type downlink BWP upon an expiration of a deactivation timer associated with the second type downlink BWP.

In one embodiment, the uplink BWP is based on a time division duplex carrier. The uplink signal is transmitted on the transmission resource when needed and when the uplink BWP is inactive. In another embodiment, the uplink BWP is based on a frequency division duplex carrier. The uplink signal is transmitted on the transmission resource only when the uplink BWP is active. The transmission resource may be configured on an initial BWP among the at least one uplink BWP for the UE to transmit the uplink signal.

In one embodiment, the BWP activator 224 may activate a BWP for the UE according to a predetermined agreement between the UE and the BS 200. This can help the UE to switch from one BWP to another. For example, upon transmitting the uplink signal, the UE may switch from the second type downlink BWP to the first type downlink BWP according to a predetermined agreement between the UE and the BS 200.

According to various embodiments, the first type downlink BWP is one of: a BWP having a same central frequency as an uplink BWP carrying the uplink signal; a latest first type downlink BWP where the UE is on before switching to the second type downlink BWP; a BWP corresponding to the uplink BWP carrying the uplink signal; an initial BWP configured for the UE; and a default BWP configured for the UE. The UE may start a deactivation timer associated with the first type downlink BWP, upon switching to the first type downlink BWP.

The transmission scheduler 226 in this example may detect the uplink signal transmitted by the UE on the transmission resource. Then the transmission scheduler 226 may transmit, via the transmitter 212 to the UE, a response to the uplink signal before an expiration of the deactivation timer. The response may be a physical downlink control channel carrying scheduling information for uplink data transmission from the UE.

In one embodiment, the transmission scheduler 226 detects the uplink signal that indicates a request for activating an associated control resource set (CORESET) or an associated search space on a currently active downlink BWP. The transmission scheduler 226 may then transmit, via the transmitter 212 on the associated search space to the UE, a first physical downlink control channel (PDCCH) carrying scheduling information for uplink data transmission from the UE. The transmission scheduler 226 may also transmit, via the transmitter 212 on a search space that overlaps at least partially with the associated search space, a second PDCCH for scheduling downlink transmissions to the UE.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the BWP configurator 220. Conversely, each of the modules illustrated in FIG. 2 can be implemented using a plurality of separate components or elements.

Figure 3:
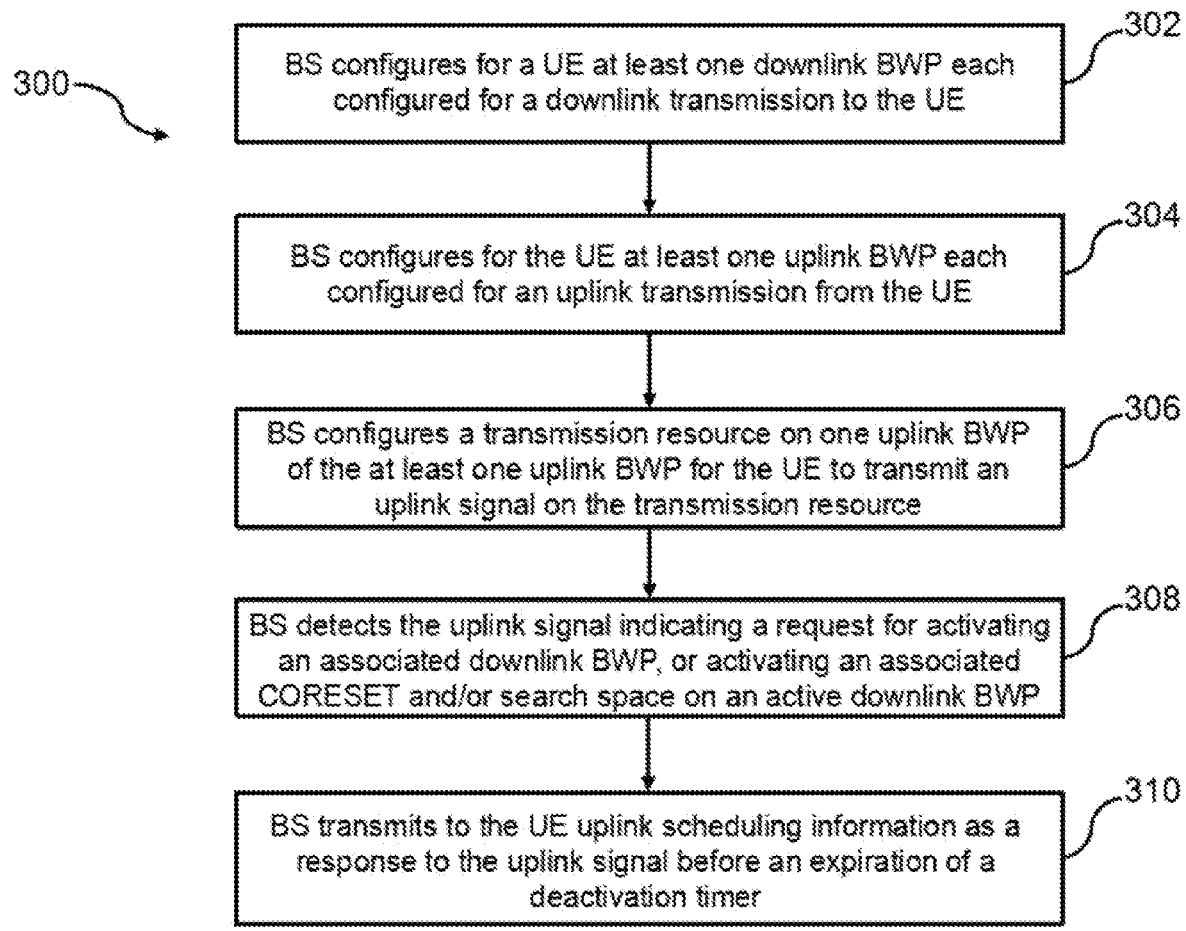
FIG. 3 illustrates a flow chart for a method performed by a BS for data transmission based on asymmetric bandwidth parts, in accordance with some embodiments of the present disclosure.

FIG. 3 illustrates a flow chart for a method 300 performed by a BS, e.g. the BS 200 in FIG. 2, for data transmission based on asymmetric BWPs, in accordance with some embodiments of the present disclosure. At operation 302, the BS configures for a UE at least one downlink BWP each configured for a downlink transmission to the UE. At operation 304, the BS configures for the UE at least one uplink BWP each configured for an uplink transmission from the UE. The BS configures at operation 306 a transmission resource on one uplink BWP of the at least one uplink BWP for the UE to transmit an uplink signal on the transmission resource. At operation 308, the BS detects the uplink signal indicating a request for activating an associated downlink BWP, or activating an associated CORESET and/or search space on an active downlink BWP. At operation 310, the BS transmits to the UE uplink scheduling information as a response to the uplink signal before an expiration of a deactivation timer. The order of the operations shown in FIG. 3 may be changed according to different embodiments of the present disclosure.

Figure 4:
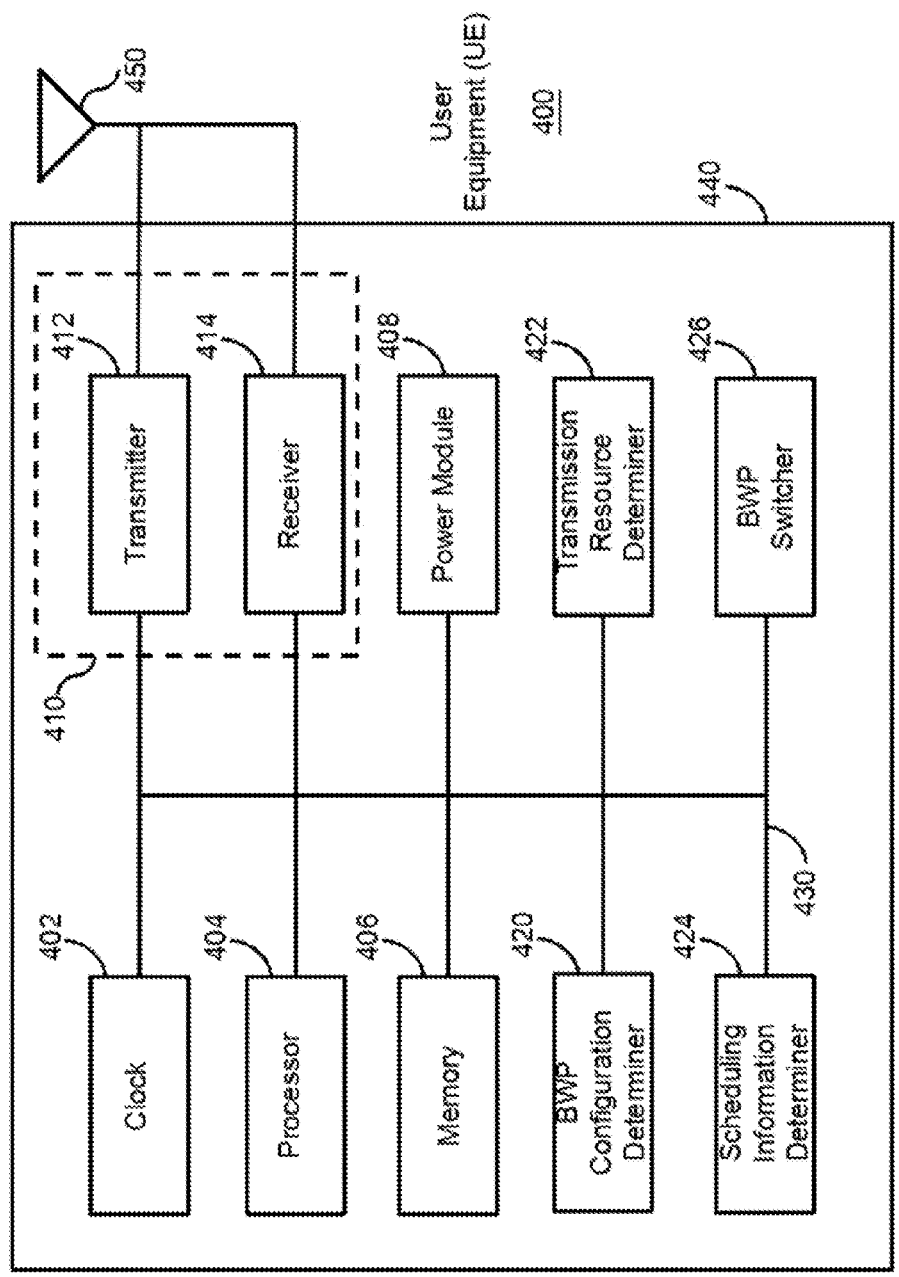
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a BWP configuration determiner 420, a transmission resource determiner 422, a scheduling information determiner 424, and a BWP switcher 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The BWP configuration determiner 420 in this example may receive from a BS a configuration of at least one downlink and a configuration of at least one uplink BWP. Each of the at least one downlink BWP is configured for a downlink transmission to the UE 400. Each of the at least one uplink BWP is configured for an uplink transmission from the UE. In one embodiment, the BWP configuration determiner 420 receives configurations of both a first type downlink BWP and a second type downlink BWP from the BS. The first type downlink BWP is configured with a control resource set (CORESET) and a search space for scheduling a physical uplink shared channel on the at least one uplink BWP. The second type downlink BWP is not configured with a CORESET or a search space for scheduling a physical uplink shared channel on the at least one uplink BWP.

The transmission resource determiner 422 in this example can determine a configuration of a transmission resource on one uplink BWP of the at least one uplink BWP, e.g. based on signal received from the BS. The transmission resource may be configured on an initial BWP among the at least one uplink BWP for the UE to transmit the uplink signal.

In one embodiment, the transmission resource may be a first type resource or a second type resource. When the uplink signal is transmitted on the first type resource, the UE 400 switches from the second type downlink BWP to the first type downlink BWP upon transmitting the uplink signal. When the uplink signal is transmitted on the second type resource, the UE 400 switches from the second type downlink BWP to the first type downlink BWP upon an expiration of a deactivation timer associated with the second type downlink BWP.

The scheduling information determiner 424 in this example may transmit, via the transmitter 412, an uplink signal on the transmission resource to the BS when the uplink BWP is inactive or active. The uplink signal indicates a request from the UE 400 for activating: an associated downlink BWP, an associated control resource set (CORESET) on an active downlink BWP, or an associated search space on an active downlink BWP. The uplink signal may be transmitted based on one of: a scheduling request; a sounding reference signal; and a physical uplink shared channel.

In one embodiment, the uplink BWP is based on a time division duplex carrier. The uplink signal is transmitted on the transmission resource when needed and when the uplink BWP is inactive. In another embodiment, the uplink BWP is based on a frequency division duplex carrier. The uplink signal is transmitted on the transmission resource only when the uplink BWP is active.

In one embodiment, the scheduling information determiner 424 may receive, via the receiver 414 on the associated search space from the BS, a first physical downlink control channel (PDCCH) carrying scheduling information for uplink data transmission from the UE 400. The scheduling information determiner 424 may also receive, via the receiver 414 on a search space that overlaps at least partially with the associated search space, a second PDCCH from the BS for scheduling downlink transmissions.

Upon transmitting the uplink signal, the UE 400 switches from the second type downlink BWP to the first type downlink BWP according to a predetermined agreement between the UE 400 and the BS. This may be performed by the BWP switcher 426.

According to various embodiments, the first type downlink BWP is one of: a BWP having a same central frequency as an uplink BWP carrying the uplink signal; a latest first type downlink BWP where the UE 400 is on before switching to the second type downlink BWP; a BWP corresponding to the uplink BWP carrying the uplink signal; an initial BWP configured for the UE 400; and a default BWP configured for the UE 400. The UE 400 may start a deactivation timer associated with the first type downlink BWP, upon switching to the first type downlink BWP. The deactivation timer may be started by either the scheduling information determiner 424 or the BWP switcher 426, according to various embodiments.

In one embodiment, the scheduling information determiner 424 receives, before an expiration of the deactivation timer, uplink scheduling information from the BS as a response to the uplink signal. Then the UE 400 can transmit uplink data based on the uplink scheduling information.

In another embodiment, the scheduling information determiner 424 determines that no uplink scheduling information is received before an expiration of the deactivation timer from the BS as a response to the uplink signal. The scheduling information determiner 424 may inform the BWP switcher 426 to switch back to the second type downlink BWP or switch to a predetermined BWP.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the BWP configuration determiner 420. Conversely, each of the modules illustrated in FIG. 4 can be implemented using a plurality of separate components or elements.

FIG. 5 illustrates a flow chart for a method 500 performed by a UE, e.g. the UE 400 in FIG. 4, for data transmission based on asymmetric BWPs, in accordance with some embodiments of the present disclosure. At operation 502, the UE receives from a BS a first type downlink BWP and a second type downlink BWP each configured for a downlink transmission to the UE. At operation 504, the UE transmits, to the BS, an uplink signal on a transmission resource on an uplink BWP. At operation 506, the UE switches from the second type downlink BWP to the first type downlink BWP according to a predetermined agreement between the UE and the BS. At operation 508, it is determined whether uplink scheduling information is detected before a deactivation of the first type downlink BWP. If so, the process goes to operation 510, where the UE transmits uplink data based on the uplink scheduling information. Otherwise, the process goes to operation 520, where the UE switches back to the second type downlink BWP or a predetermined BWP. The order of the operations shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, a BS configures for a UE at least one downlink BWP among two types of downlink BWPs (referred to as a first type downlink BWP and a second type downlink BWP) and at least one uplink BWP. For a target UE, at most one active BWP exists for a same link direction at one time. The first type downlink BWP is configured with CORESET and search spaces for scheduling a physical downlink shared channel (PDSCH) on the activated first type downlink BWP and for scheduling a physical uplink shared channel (PUSCH) on the at least one uplink BWP. While the second type downlink BWP is merely configured with a CORESET and a search space for scheduling a PDSCH on the activated second type downlink BWP, but not configured with a CORESET and a search space for scheduling a PUSCH on the at least one uplink BWP.

Without loss of generality, the first type downlink BWP is mainly applied to a traditional unicast service. Such unicast service usually requires a BWP in the reverse direction to feed back any error about data reception, channel state information (CSI) measurement report, etc. The second type downlink BWP is mainly used for downlink multicast or broadcast services that do not need uplink feedback. That is, the UE does not need to use an uplink BWP to feed back error of receiving data on the second type downlink BWP for the multicast or broadcast services.

According to various embodiments of the present teaching, the BS configures scheduling request (SR) resources (referred to as first uplink resources) on one or more uplink BWPs. The UE may utilize the uplink BWP to transmit the SR resource to request to activate a first type downlink BWP when needed.

Further, if the uplink BWP is a BWP on a time division duplex (TDD) carrier, when the uplink BWP is in an inactive or active state, the UE may still utilize the uplink BWP to transmit the SR resource when needed. If the uplink BWP is a BWP on a frequency division duplex (FDD) carrier, the UE may utilize the uplink BWP to transmit the SR resource only when the uplink BWP is in an active state.

In particular, at least one of the above mentioned configured BWPs is an initial BWP. That is, the BS at least configures SR resources on the initial BWP. On the terminal side, it is assumed that the UE is staying on the second type downlink BWP. At this time, the second type downlink BWP is activated, and the first type downlink BWP is in the deactivated state.

If the UE sends an SR signal on an uplink BWP (e.g. when the UE has uplink data to transmit), the UE switches from the second type downlink BWP to one of the configured first type downlink BWPs. The first type downlink BWP is a BWP selected from the following: (a) a BWP having a same central frequency as an uplink BWP carrying the SR signal; (b) a latest first type downlink BWP where the UE is on before switching to the second type downlink BWP; (c) a first type downlink BWP corresponding to the uplink BWP carrying the SR signal (provided herein that the first type downlink BWP and the uplink BWP has a predetermined correspondence relationship, e.g. a first type downlink BWP having index 1 corresponds to an uplink BWP having index 1); (d) an initial BWP configured for the UE; and (e) a default BWP configured for the UE.

Beginning from a preset time after transmitting the SR signal, the UE starts a BWP deactivation timer corresponding to the above mentioned first type downlink BWP. To avoid confusion with the following BWP deactivation timer, this BWP deactivation timer may be referred to as a first BWP deactivation timer. The preset time is a value that is known in advance to both the transmitting end and the receiving end. For example, the preset time may be Q symbols or time slots after the end of the above SR signal transmission.

At the BS side, the BS detects the received signals. If the base station detects a SR signal transmitted by the UE, in response to the request of the UE, the base station may transmit a scheduling grant on the first type downlink BWP before an expiration of the first BWP deactivation timer. The scheduling grant is usually a PDCCH carrying the uplink scheduling information.

At the terminal side, the UE performs detection on the control channel of the first type downlink BWP before the expiration of the first BWP deactivation timer. If no uplink scheduling grant is detected before the first BWP deactivation timer times out, the UE may switch to the above mentioned second type downlink BWP to receive traffic data on the second type downlink BWP, or switch to a predetermined first type downlink BWP which may be specified in advance by the base station. If the uplink scheduling grant sent by the base station is detected before the first BWP deactivation timer times out, the UE transmits uplink data according to the uplink scheduling grant. Further, if the uplink BWP for transmitting the uplink data was deactivated, the UE first activates the uplink BWP and then transmits data on the activated uplink BWP. This uplink BWP for transmitting uplink data may be different from the BWP for the SR signal transmission. Upon activating the uplink BWP, the UE may start (or restart) a second BWP deactivation timer corresponding to the uplink BWP.

The mechanism described in this embodiment can effectively solve the problem that: when the UE stays on a multicast BWP, the UE cannot transmit the uplink data even if the uplink BWP of the UE is in an active state. In addition, according to this embodiment, after the uplink data transmission is completed, the UE can switch back to the multicast BWP with a small overhead. This enables the UE to maintain the continuity of the multicast service while transmitting uplink data, because the UE can receive downlink unicast data when the UE switches to the first type downlink BWP.

In a second embodiment, a BS configures for a UE at least one downlink BWP among two types of downlink BWPs (referred to as a first type downlink BWP and a second type downlink BWP) and at least one uplink BWP. For a target UE, at most one active BWP exists for a same link direction at one time. The first type downlink BWP is configured with CORESET and search spaces for scheduling a physical downlink shared channel (PDSCH) on the activated first type downlink BWP and for scheduling a physical uplink shared channel (PUSCH) on the at least one uplink BWP. While the second type downlink BWP is merely configured with a CORESET and a search space for scheduling a PDSCH on the activated second type downlink BWP, but not configured with a CORESET and a search space for scheduling a PUSCH on the at least one uplink BWP.

Without loss of generality, the first type downlink BWP is mainly applied to a traditional unicast service. Such unicast service usually requires a BWP in the reverse direction to feed back any error about data reception, channel state information (CSI) measurement report, etc. The second type downlink BWP is mainly used for downlink multicast or broadcast services that do not need uplink feedback. That is, the UE does not need to use an uplink BWP to feed back error of receiving data on the second type downlink BWP for the multicast or broadcast services.

According to various embodiments of the present teaching, the BS configures sounding reference signal (SRS) resources (referred to as second uplink resources) on one or more uplink BWPs. The UE may utilize the uplink BWP to transmit the SRS resource to request to activate a first type downlink BWP when needed.

Further, if the uplink BWP is a BWP on a time division duplex (TDD) carrier, when the uplink BWP is in an inactive or active state, the UE may utilize the uplink BWP to transmit the SRS resource when needed. If the uplink BWP is a BWP on a frequency division duplex (FDD) carrier, the UE may utilize the uplink BWP to transmit the SRS resource only when the uplink BWP is in an active state.

In particular, at least one of the above mentioned configured BWPs is an initial BWP. That is, the BS at least configures SRS resources on the initial BWP. On the terminal side, it is assumed that the UE is staying on the second type downlink BWP (e.g. after switching to the second type downlink BWP from a certain first type downlink BWP). At this time, the second type downlink BWP is in an activated state, and the first type downlink BWP is in a deactivated state.

If the UE sends an SRS signal on an uplink BWP (e.g. when the UE has uplink data to transmit), the UE switches from the second type downlink BWP to one of the configured first type downlink BWPs. The first type downlink BWP is a BWP selected from the following: (a) a BWP having a same central frequency as an uplink BWP carrying the SRS signal; (b) a latest first type downlink BWP where the UE is on before switching to the second type downlink BWP; (c) a first type downlink BWP corresponding to the uplink BWP carrying the SRS signal (provided herein that the first type downlink BWP and the uplink BWP has a predetermined correspondence relationship, e.g. a first type downlink BWP having index 1 corresponds to an uplink BWP having index 1); (d) an initial BWP configured for the UE; and (e) a default BWP configured for the UE.

Beginning from a preset time after transmitting the SRS signal, the UE starts a BWP deactivation timer corresponding to the above mentioned first type downlink BWP. To avoid confusion with the following BWP deactivation timer, this BWP deactivation timer may be referred to as a first BWP deactivation timer. The preset time is a value that is known in advance to both the transmitting end and the receiving end. For example, the preset time may be Q symbols or time slots after the end of the above SRS signal transmission.

At the BS side, the BS detects the received signals. If the base station detects a SRS signal transmitted by the UE, in response to the request of the UE, the base station may transmit a scheduling grant on the first type downlink BWP before an expiration of the first BWP deactivation timer. The scheduling grant is usually a PDCCH carrying the uplink scheduling information.

At the terminal side, the UE performs detection on the control channel of the first type downlink BWP before the expiration of the first BWP deactivation timer. If no uplink scheduling grant is detected before the first BWP deactivation timer times out, the UE may switch to the above mentioned second type downlink BWP to receive traffic data on the second type downlink BWP, or switch to a predetermined first type downlink BWP which may be specified in advance by the base station. If the uplink scheduling grant sent by the base station is detected before the first BWP deactivation timer times out, the UE transmits uplink data according to the uplink scheduling grant. Further, if the uplink BWP for transmitting the uplink data was deactivated, the UE first activates the uplink BWP and then transmits data on the activated uplink BWP. This uplink BWP for transmitting uplink data may be different from the BWP for the SRS signal transmission. Upon activating the uplink BWP, the UE may start (or restart) a second BWP deactivation timer corresponding to the uplink BWP.

In a third embodiment, a BS configures for a UE at least one downlink BWP among two types of downlink BWPs (referred to as a first type downlink BWP and a second type downlink BWP) and at least one uplink BWP. For a target UE, at most one active BWP exists for a same link direction at one time. The first type downlink BWP is configured with CORESET and search spaces for scheduling a physical downlink shared channel (PDSCH) on the activated first type downlink BWP and for scheduling a physical uplink shared channel (PUSCH) on the at least one uplink BWP. While the second type downlink BWP is merely configured with a CORESET and a search space for scheduling a PDSCH on the activated second type downlink BWP, but not configured with a CORESET and a search space for scheduling a PUSCH on the at least one uplink BWP.

Without loss of generality, the first type downlink BWP is mainly applied to a traditional unicast service. Such unicast service usually requires a BWP in the reverse direction to feed back any error about data reception, channel state information (CSI) measurement report, etc. The second type downlink BWP is mainly used for downlink multicast or broadcast services that do not need uplink feedback. That is, the UE does not need to use an uplink BWP to feed back error of receiving data on the second type downlink BWP for the multicast or broadcast services.

According to various embodiments of the present teaching, the BS configures PUSCH resources (referred to as third uplink resources) on one or more uplink BWPs. The UE may utilize the uplink BWP to transmit the PUSCH resource to request to activate a first type downlink BWP when needed. Such PUSCH resources can usually be used in semi-static cycles.

Further, if the uplink BWP is a BWP on a time division duplex (TDD) carrier, when the uplink BWP is in an inactive or active state, the UE may utilize the uplink BWP to transmit the PUSCH resource when needed. If the uplink BWP is a BWP on a frequency division duplex (FDD) carrier, the UE may utilize the uplink BWP to transmit the PUSCH resource when the uplink BWP is in an active state.

In particular, at least one of the above mentioned configured BWPs is an initial BWP. That is, the BS at least configures PUSCH resources on the initial BWP. On the terminal side, it is assumed that the UE is staying on the second type downlink BWP (e.g. after switching to the second type downlink BWP from a certain first type downlink BWP). At this time, the second type downlink BWP is in an activated state, and the first type downlink BWP is in a deactivated state.

If the UE transmits data using the above mentioned PUSCH resource on an uplink BWP (e.g. the data may be ordinary service data, or a MAC CE carrying a BSR report, or a combination of the two, etc.), the UE switches from the second type downlink BWP to one of the configured first type downlink BWPs. The first type downlink BWP is a BWP selected from the following: (a) a BWP having a same central frequency as an uplink BWP carrying the PUSCH signal; (b) a latest first type downlink BWP where the UE is on before switching to the second type downlink BWP; (c) a first type downlink BWP corresponding to the uplink BWP carrying the PUSCH signal (provided herein that the first type downlink BWP and the uplink BWP has a predetermined correspondence relationship, e.g. a first type downlink BWP having index 1 corresponds to an uplink BWP having index 1); (d) an initial BWP configured for the UE; and (e) a default BWP configured for the UE.

Beginning from a preset time after transmitting the PUSCH signal, the UE starts a BWP deactivation timer corresponding to the above mentioned first type downlink BWP. To avoid confusion with the following BWP deactivation timer, this BWP deactivation timer may be referred to as a first BWP deactivation timer. The preset time is a value that is known in advance to both the transmitting end and the receiving end. For example, the preset time may be Q symbols or time slots after the end of the above PUSCH signal transmission.

At the BS side, the BS detects the received signals. If the base station detects a PUSCH signal transmitted by the UE, in response to the request of the UE, the base station may transmit a scheduling grant on the first type downlink BWP before an expiration of the first BWP deactivation timer. The scheduling grant is usually a PDCCH carrying the uplink scheduling information. This uplink scheduling information may instruct the UE to retransmit data that were previously transmitted with error or to transmit new data.

At the terminal side, the UE performs detection on the control channel of the first type downlink BWP before the expiration of the first BWP deactivation timer. If no uplink scheduling grant is detected before the first BWP deactivation timer times out, the UE may switch to the above mentioned second type downlink BWP to receive traffic data on the second type downlink BWP, or switch to a predetermined first type downlink BWP which may be specified in advance by the base station. If the uplink scheduling grant sent by the base station is detected before the first BWP deactivation timer times out, the UE transmits uplink data according to the uplink scheduling grant. Further, if the uplink BWP for transmitting the uplink data was deactivated, the UE first activates the uplink BWP and then transmits data on the activated uplink BWP. This uplink BWP for transmitting uplink data may be different from the BWP for the PUSCH signal transmission. Upon activating the uplink BWP, the UE may start (or restart) a second BWP deactivation timer corresponding to the uplink BWP.

In a fourth embodiment, the base station configures a plurality of uplink resources for the UE. The plurality of uplink resources may be: a plurality of first uplink resources on one or more uplink BWPs according to the first embodiment, or a plurality of second uplink resources on the one or more uplink BWPs according to the second embodiment, or a plurality of third uplink resources on the one or more uplink BWPs according to the third embodiment. The configured plurality of uplink resources are divided into two groups. When an uplink resource in the first group is transmitted, the UE and the BS operate in accordance with the first, second, or third embodiment described above. When an uplink resource in the second group is transmitted, the UE still resides on the second type downlink BWP. Only after a third BWP deactivation timer corresponding to the second type downlink BWP times out or expires, the UE switches from the second type downlink BWP to a pre-configured first type downlink BWP.

The first type downlink BWP is a BWP selected from the following: (a) a BWP having a same central frequency as an uplink BWP carrying the transmitted uplink resource in the second group; (b) a latest first type downlink BWP where the UE is on before switching to the second type downlink BWP; (c) a first type downlink BWP corresponding to the uplink BWP carrying the transmitted uplink resource in the second group (provided herein that the first type downlink BWP and the uplink BWP has a predetermined correspondence relationship, e.g. a first type downlink BWP having index 1 corresponds to an uplink BWP having index 1); (d) an initial BWP configured for the UE; and (e) a default BWP configured for the UE.

After the BWP switching is completed, the UE starts a fourth BWP deactivation timer corresponding to the first type downlink BWP. After the fourth BWP deactivation timer expires, the UE switches to the default BWP or the above mentioned second type downlink BWP.

Further, only the first uplink resource (or the second uplink resource) in the first group may be transmitted when the BWP is in a deactivated state. The first uplink resources (or the second uplink resources) in the two different groups may be distinguished based on: time-frequency locations of these resources, the sequences used for these resources, or a combination of the above. The third uplink resources in the two different groups may be distinguished based on: time-frequency locations of these resources, the reference signals for these resources, coding and modulation schemes for these resources, or a combination of the above.

In a fifth embodiment, the base station configures at least one downlink BWP and at least one uplink BWP for a UE. The BS configures, on the uplink BWP, one or more above mentioned uplink resource signals, which may be the first uplink signal SR, the second uplink signal SRS, and/or the third uplink signal PUSCH.

For a target UE, at one moment, at most one BWP is active in a same direction. Control channel search spaces corresponding to the first, second and third uplink signals are configured on the downlink BWP. The UE may perform detection on the search spaces to determine whether there is PDCCH addressed to the UE. The PDCCH transmitted on a search space may be used at least for scheduling PUSCH on the uplink BWP.

In an initial state, the search space is deactivated. The terminal may use configured transmission resource to transmit the above mentioned first, second or third uplink signal. Then at a preset time after transmitting the first, second or third uplink signal, the UE starts a search space deactivation timer related to the search space corresponding to the transmitted first, second or third uplink signal. The preset time is a value that is known in advance to both the transmitting end and the receiving end. For example, the preset time may be Q symbols or time slots after the end of the transmission of the first, second or third uplink signal.

At the BS side, the BS detects the received signals. If the base station detects a first, second or third uplink signal transmitted by the UE, in response to the request of the UE, the base station may transmit a scheduling grant on the above mentioned CORESET and search space before an expiration of the search space deactivation timer. The scheduling grant is usually a PDCCH carrying the uplink scheduling information. This uplink scheduling information may instruct the UE to retransmit data that had transmission error or to transmit new data.

Further, if the above mentioned search space overlaps or shares with a search space for downlink scheduling, the base station may further send a PDCCH for downlink scheduling in the above mentioned search space.

At the terminal side, the UE performs detection on the search space of the above-mentioned control channel before the expiration of the search space deactivation timer. If no PDCCH addressed to the UE is detected before the search space deactivation timer times out, the UE may deactivate the search space. If a PDCCH addressed to the UE is detected before the search space deactivation timer times out, the UE transmits or receives data according to the instruction of the PDCCH. At the same time, the UE may restart the search space deactivation timer.

Further, if no PDCCH addressed to the UE is detected before the search space deactivation timer times out, the UE can re-transmit the first, second or third uplink signal, or transmit a search space deactivation acknowledgment message, according to various embodiments of the present teaching. Further, the base station may send a dedicated signaling to activate the above mentioned search space. When the UE receives the signaling, the UE will start or restart the search space deactivation timer.

The fifth embodiment is particularly adapted to a scenario where: the activated downlink BWP of the UE is a BWP supporting multicast service, and the activated uplink BWP of the UE is a unicast service BWP. In this scenario, based on fifth embodiment, when the UE has no uplink service, the corresponding search space can be deactivated. This reduces the complexity for the UE to detect PDCCH, and saves power consumption of the UE. When the UE has the uplink service, the corresponding search space is activated. The UE can receive and send unicast services without BWP switching, which saves the overhead of the switching delay and ensures the continuity of the unicast and/or multicast services to the greatest extent.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, the method comprising:
    configuring at least one downlink bandwidth part (BWP) for a wireless communication device, wherein each of the at least one downlink BWP is configured for a downlink transmission to the wireless communication device;
    configuring at least one uplink BWP for the wireless communication device, wherein each of the at least one uplink BWP is configured for an uplink transmission from the wireless communication device; configuring a transmission resource on one uplink BWP of the at least one uplink BWP for the wireless communication device to transmit an uplink signal on the transmission resource, wherein the uplink signal indicates a request for activating a downlink BWP associated with the at least one uplink BWP; and
    transmitting, to the wireless communication device, a response to the uplink signal, wherein the response is a physical downlink control channel carrying scheduling information for uplink data transmission from the wireless communication device.

2. The method of claim 1, comprising configuring a first type downlink BWP and a second type downlink BWP for the wireless communication device, wherein:
    the first type downlink BWP is configured with a control resource set (CORESET) and a search space for scheduling a physical uplink shared channel on the at least one uplink BWP; and
    the second type downlink BWP is not configured with a CORESET or a search space for scheduling a physical uplink shared channel on the at least one uplink BWP.

3. The method of claim 2, wherein, upon transmitting the uplink signal, the wireless communication device switches from the second type downlink BWP to the first type downlink BWP according to a predetermined agreement between the wireless communication device and the wireless communication node.

4. The method of claim 3, wherein the first type downlink BWP is one of:
    a BWP having a same central frequency as an uplink BWP carrying the uplink signal;
    a latest first type downlink BWP where the wireless communication device is on before switching to the second type downlink BWP;

a BWP corresponding to the uplink BWP carrying the uplink signal;
an initial BWP configured for the wireless communication device; and
a default BWP configured for the wireless communication device.

5. The method of claim 3, wherein, upon switching to the first type downlink BWP, the wireless communication device starts a deactivation timer associated with the first type downlink BWP.

6. The method of claim 5, further comprising:
detecting the uplink signal transmitted by the wireless communication device on the transmission resource; and
transmitting, to the wireless communication device, the response to the uplink signal before an expiration of the deactivation timer.

7. The method of claim 2, wherein:
the transmission resource is a first type resource or a second type resource;
when the uplink signal is transmitted on the first type resource, the wireless communication device switches from the second type downlink BWP to the first type downlink BWP upon transmitting the uplink signal; and
when the uplink signal is transmitted on the second type resource, the wireless communication device switches from the second type downlink BWP to the first type downlink BWP upon an expiration of a deactivation timer associated with the second type downlink BWP.

8. The method of claim 1, wherein the uplink signal is transmitted based on one of: a scheduling request; a sounding reference signal; and a physical uplink shared channel.

9. The method of claim 1, wherein:
the uplink BWP is based on a time division duplex carrier; and
the uplink signal is transmitted on the transmission resource when needed and when the uplink BWP is inactive or active.

10. The method of claim 1, wherein:
the uplink BWP is based on a frequency division duplex carrier; and
the uplink signal is transmitted on the transmission resource only when the uplink BWP is active.

11. The method of claim 1, wherein:
the transmission resource is configured on an initial BWP among the at least one uplink BWP for the wireless communication device to transmit the uplink signal.

12. A method performed by a wireless communication device, the method comprising:
receiving a configuration of at least one downlink bandwidth part (BWP) from a wireless communication node, wherein each of the at least one downlink BWP is configured for a downlink transmission to the wireless communication device;
receiving a configuration of at least one uplink BWP from the wireless communication node, wherein each of the at least one uplink BWP is configured for an uplink transmission from the wireless communication device;
receiving a configuration of a transmission resource on one uplink BWP of the at least one uplink BWP;
transmitting an uplink signal on the transmission resource to the wireless communication node, wherein the uplink signal indicates a request for activating a downlink BWP associated with the at least one uplink BWP; and
receiving uplink scheduling information from the wireless communication node as a response to the uplink signal.

13. The method of claim 12, further comprising:
receiving, on a first search space associated with the downlink BWP from the wireless communication node, a first physical downlink control channel (PDCCH) carrying scheduling information for uplink data transmission from the wireless communication device; and
receiving, on a second search space that overlaps at least partially with the first search space, a second PDCCH from the wireless communication node for scheduling downlink transmissions.

14. A wireless communication node, comprising:
at least one processor configured to:
configure at least one downlink bandwidth part (BWP) for a wireless communication device, wherein each of the at least one downlink BWP is configured for a downlink transmission to the wireless communication device;
configure at least one uplink BWP for the wireless communication device, wherein each of the at least one uplink BWP is configured for an uplink transmission from the wireless communication device;
configure a transmission resource on one uplink BWP of the at least one uplink BWP for the wireless communication device to transmit an uplink signal on the transmission resource, wherein the uplink signal indicates a request for activating a downlink BWP associated with the at least one uplink BWP; and
transmit, to the wireless communication device, a response to the uplink signal, wherein the response is a physical downlink control channel carrying scheduling information for uplink data transmission from the wireless communication device.

15. The wireless communication node of claim 14, wherein the at least one processor is further configured to configure a first type downlink BWP and a second type downlink BWP for the wireless communication device, wherein:
the first type downlink BWP is configured with a control resource set (CORESET) and a search space for scheduling a physical uplink shared channel on the at least one uplink BWP; and
the second type downlink BWP is not configured with a CORESET or a search space for scheduling a physical uplink shared channel on the at least one uplink BWP.

16. The wireless communication node of claim 15, wherein, upon transmitting the uplink signal, the wireless communication device switches from the second type downlink BWP to the first type downlink BWP according to a predetermined agreement between the wireless communication device and the wireless communication node.

17. The wireless communication node of claim 16, wherein the first type downlink BWP is one of:
a BWP having a same central frequency as an uplink BWP carrying the uplink signal;
a latest first type downlink BWP where the wireless communication device is on before switching to the second type downlink BWP;
a BWP corresponding to the uplink BWP carrying the uplink signal;
an initial BWP configured for the wireless communication device; and
a default BWP configured for the wireless communication device.

18. The wireless communication node of claim 16, wherein, upon switching to the first type downlink BWP, the wireless communication device starts a deactivation timer associated with the first type downlink BWP.

19. The wireless communication node of claim 18, wherein the at least one processor is further configured to:
   detect the uplink signal transmitted by the wireless communication device on the transmission resource; and
   transmit, to the wireless communication device, the response to the uplink signal before an expiration of the deactivation timer.

20. The wireless communication node of claim 15, wherein:
   the transmission resource is a first type resource or a second type resource;
   when the uplink signal is transmitted on the first type resource, the wireless communication device switches from the second type downlink BWP to the first type downlink BWP upon transmitting the uplink signal; and
   when the uplink signal is transmitted on the second type resource, the wireless communication device switches from the second type downlink BWP to the first type downlink BWP upon an expiration of a deactivation timer associated with the second type downlink BWP.

* * * * *